Patented Sept. 7, 1926.

1,599,119

UNITED STATES PATENT OFFICE.

AUGUSTIN AMÉDÉE LOUIS JOSEPH DAMIENS, OF SEVRES, MARIE CHARLES JOSEPH ELYSÉE DE LOISY, OF PARIS, FRANCE, AND OLIVIER JOSEPH GISLAIN PIETTE, OF BRUSSELS, BELGIUM.

PROCESS FOR THE RAPID FIXING OF ETHYLENE BY MEANS OF SULPHURIC ACID FOR THE PURPOSE OF OBTAINING NEUTRAL ETHYL SULPHATE.

No Drawing. Original application filed April 13, 1922, Serial No. 552,306, and in France June 2, 1921. Divided and this application filed September 5, 1923. Serial No. 661,090.

The present application is a division of our patent application Serial No. 552,306, filed April 13th, 1922 relating to a process for the rapid fixing of ethylene by means of sulphuric acid for the purpose of obtaining ethyl sulphuric esters, which application has resulted in the grant of Letters Patent No. 1,574,796 dated March 2, 1926.

The present application relates to a process for the rapid fixing of ethylene by means of sulphuric acid for the purpose of obtaining neutral ethyl sulphate.

Various authors among them Plant and Sidgwick, as well as Henry R. Curme, have shown that it is possible to obtain neutral ethyl sulphate by the action of sulphuric acid on ethylene under the influence of heat; Plant and Sidgwick have shown that by operating at a temperature from 50° to 70° C. neutral ethyl sulphate begins to form only when the sulphuric acid has absorbed 20% of its weight of ethylene, this corresponding to 75% of ethyl sulphuric acid in the liquid. The output in neutral ethyl sulphate relatively to the ethylene used is therefore very small since a large portion of the ethylene is used up to form ethyl sulphuric acid.

The process forming the subject-matter of the present patent application allows, on the contrary, to manufacture neutral ethyl sulphate starting from ethylene or from the complex gas which contains the latter, on a commercial scale and with an output as high as possible.

This process consists essentially in treating ethylene, or the complex gas which contains the latter, with sulphuric acid containing at least 97% of $H_2SO_4$, to which is added as catalyzer a compound of a common metal containing the metal under its smallest valency, the temperature during the reaction being maintained between 0° and 15° C.

The process is characterized essentially by the use of a catalyzer composed of iron, copper, or equivalent common or base metal containing the metal under its smallest valency, for instance a ferrous compound $FeSO_4$ (and not a ferric compound such as $Fe_2(SO_4)_3$), a cuprous compound (and not a cupric compound), such as sub-chloride of copper $Cu_2Cl_2$, suboxide of copper $Cu_2O$, sub-sulphate of copper $Cu_2SO_4$, etc., or any compounds capable of giving them birth, for instance, copper sulphate $CuSO_4$ and a reducing body which will transform it into cuprous sulphate $Cu_2SO_4$.

During the reaction of sulphuric acid on ethylene in presence of the above mentioned catalyzer, the temperature must be maintained between 0° and 15° C. as above set forth; the output in neutral ethyl sulphate will be the higher, the nearer the temperature approaches 0° C.

The operation of fixing ethylene is continued until the reagent is saturated with the gas and ceases to absorb it.

At the end of the operation, the acid is diluted and the neutral ethyl sulphate is collected, this neutral ethyl sulphate floating on the surface of the sulphuric acid which retains in solution a very small proportion only of ethylsulphuric acid.

By means of the present process, the fixing of ethylene by sulphuric acid is rapidly effected at ordinary temperature and the neutral ethyl sulphate begins to form when the acid reaches a concentration in acid sulphate or ethyl sulphuric acid which is only of 25.6% instead of 75% in the old process. The final output is therefore very considerably increased.

This process presents the main following advantages:

1°—The absorption of ethylene is effected with great rapidity and owing to the low temperature at which the process is carried out, the sulphuric acid does not substantially exert any prejudicial action on the products formed.

2°—The catalyzing body used is a common and cheap product.

3°—This catalyzing body is insoluble in sulphuric acid, which differentiates it from the catalyzers used up to this day which were soluble. The considerable advantages connected with this property are, on the one hand, that the greater division of the acid is promoted by the presence in its mass of a precipitate in suspension and, on the other hand, that the catalyzer can easily be collected at the end of the operation, by decantation, filtration or centrifuging, and be used over again for subsequent reactions.

For carrying out the present process in the case of its application to the trapping of ethylene contained in industrial gases: natural gas, gas from the distillation of fuels (coke oven gas, illuminating gas, cracking gas, schist gas, synthetic ethylene, etc.) it is preferable first to free these gases from benzol and ammonia, to dehydrate them and, generally speaking, to free them from products which might be objectionable on account of their action either on the acid or on the catalyzing body (hydrocarbons of the acetylene and ethylene series, homologues of ethylene, sulphurated compounds, etc.).

The reagent fixing the ethylene (sulphuric acid to which is added the catalyzing body) is, after absorption, subjected to a decantation, filtration or centrifuging, so that the catalyzing body can be collected and can be introduced into the circulation after or without purification.

While in the appended claims we have mentioned the use of copper compounds as catalyzers, we desire it to be understood that iron and other equivalents may be substituted for copper, and the claims are to be interpreted as covering such equivalents.

Claims:

1. A process for the rapid fixing of ethylene by sulphuric acid for the purpose of obtaining neutral ethyl sulphate, which consists: in adding, as catalyzer, to sulphuric acid containing at least 97% of $H_2SO_4$, a compound containing copper in the monovalent state,—in causing a gaseous current containing ethylene to pass through this acid, the temperature being maintained between 0° and 15° C. during the reaction,—separating the catalyzer from the acid, diluting the latter, and collecting the neutral ethyl sulphate which floats to the surface of the sulphuric acid, which latter retains in solution a very small proportion only of ethyl sulphuric acid.

2. A process for the rapid fixing of ethylene by sulphuric acid for the purpose of obtaining neutral ethyl sulphate, which consists: in adding, as catalyzer, to sulphuric acid containing at least 97% of $H_2SO_4$, suboxide of copper, in causing a gaseous current containing ethylene to pass through this acid, the temperature being maintained between 0° and 15° C. during the reaction, separating the catalyzer from the acid, diluting the latter, and collecting the neutral ethyl sulphate which floats to the surface of the sulphuric acid, which latter retains in solution a very small proportion only of ethyl sulphuric acid.

The foregoing specification of our "process for the rapid fixing of ethylene by means of sulphuric acid for the purpose of obtaining neutral ethyl sulphate", signed at Paris, France, this 20th day of July 1923, by—

AUGUSTIN AMÉDÉE LOUIS JOSEPH DAMIENS.
MARIE CHARLES JOSEPH ELYSÉE de LOISY.

and at Brussels, Belgium, this 14th day of August 1923, by—

OLIVIER JOSEPH GISLAIN PIETTE.